United States Patent
Diers

(10) Patent No.: US 6,837,062 B2
(45) Date of Patent: Jan. 4, 2005

(54) BACTERIA RESISTANT BUTCHER TABLE

(76) Inventor: Wilfred F. Diers, c/o Jerome A. Zivan, Chesser, Wingard, Barr & Fleet, 1201 Elgin Pkwy., Shalimar, IL (US) 32579

( * ) Notice: Subject to any disclaimer, the term of this patent is extended or adjusted under 35 U.S.C. 154(b) by 0 days.

(21) Appl. No.: 10/397,847

(22) Filed: Mar. 27, 2003

(65) Prior Publication Data

US 2004/0040476 A1 Mar. 4, 2004

(51) Int. Cl.[7] ............................................ F25C 1/00
(52) U.S. Cl. ................................... 62/258; 62/356
(58) Field of Search ......................... 62/235, 258, 340, 62/356

(56) References Cited

U.S. PATENT DOCUMENTS

| | | | |
|---|---|---|---|
| 1,638,041 A | * | 8/1927 | Korkames .................... 99/483 |
| 4,189,928 A | * | 2/1980 | Cerny ........................... 62/66 |
| 4,467,619 A | * | 8/1984 | Kovach ........................ 62/235 |
| 5,415,010 A | * | 5/1995 | Woo ............................. 62/258 |

FOREIGN PATENT DOCUMENTS

DE          297 14 728     * 11/1997

* cited by examiner

Primary Examiner—William E. Tapolcai
(74) Attorney, Agent, or Firm—Richard C. Litman

(57) ABSTRACT

A bacteria resistant butcher table is having a flat level top including a shallow tub within which is placed a butcher block or work surface. Water fills the tub over the top of the work surface insert and is frozen therein. As food preparation proceeds, layers of ice which now constitute the work surface are worn away and replaced by newly frozen water provided from around the sides of the work surface block. A refrigeration system is provided beneath the flat top and has its cooling coils arranged immediately beneath the tub. Water is provided through perforated water piping about the sides of the tub work surface insert. Four support legs include leveling pads or feet to keep the top perfectly level.

10 Claims, 3 Drawing Sheets

BACTERIA RESISTANT BUTCHER TABLE

BACKGROUND OF THE INVENTION

1. Field of the Invention

The present invention relates to food preparation tables in general and, more specifically, a bacteria resistant food preparation table, e.g., a butcher table, having a work surface made up of a frozen layer of water over a solid work surface.

2. Description of the Related Art

Problems of bacteria associated with food preparation, particularly butchering, are substantial. The work surface of a butcher table must be either constantly cleaned or replaced; the choices available to assure the work area remains hygienic and bacteria-free are time consuming and expensive. What is needed is a work surface that is hygienic and does not need to be manually cleaned or replaced all the time. The instant invention provides the answer in the form of a table with an ice work surface cold enough (0 degrees C.) to prevent bacterial contamination and simultaneously replaced (about every 20 to 30 minutes or so) as layers of ice are ablated as food preparation, e.g. butchering, progresses.

Nothing as taught in the related art, taken either singly or in combination, is seen to describe the instant invention as claimed. Thus a bacteria resistant butcher table solving the aforementioned problems is desired.

SUMMARY OF THE INVENTION

The bacteria resistant butcher table provides a flat upper table top with a built-in tub, within which a working flat surface, or butcher block, is placed. The tub is filled with cold water frozen by a refrigeration system around the block, and covering the upper surface thereof with thin ice layers which are ablated as work progresses. Water is allowed to flow into the tub at a controlled rate so as to be frozen and replace the worn away layers. The system is engineered so that a new ice sheet or layers are formed about every 20 to 30 minutes or so.

The work surface is supported by four legs and a ventilated cabinet is located immediately beneath the work surface for housing the refrigeration system. The legs include adjustable pads or feet which are used to assure that the upper work surface is level, so that ice forms evenly on the work or cutting/butchering surface.

The work block or butcher block has a specific gravity greater than 1, of course, so that it does not float above the water (which becomes ice) in the tub. Suitable materials for the steel, hard dense woods, ceramics, and other known materials suitable for food preparation, particularly butchering. Also, knives, cleavers and other food preparation tools stay sharp longer as they strike or are pressed against only an ice surface, and not the usual hard butcher block surface. The invention can be used for preparation of any kind of foodstuff, although it is particularly suitable for the butchering of meat.

Accordingly, it is a principal object of the invention to provide a bacteria resistant butcher or food preparation table that includes an ice work surface layer over an underlying food preparation block in a tub continually periodically provided with water freezing to form a replacement layer or layers as the active work surface of the table.

It is another object of the invention to provide an ice-covered work block for butchering and other food preparation, the block being made of any one or more of suitable materials including hard dense plastic, stainless steel, hard wood, ceramic, glass or any other material suitable for food preparation.

It is a further object of the invention to provide an ice covered butchering work surface which is cold enough to prevent the active presence of bacteria (about 0 degrees C.).

Still another object of the invention is to provide an ablative food preparation work surface which is automatically replaced by a fresh, clean surface as work progresses.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a food preparation table particularly suitable for butchering which includes an ablative, constantly replaced upper work surface of ice, which is also bacteria and microorganism resistant since its temperature is maintained at about 0 degrees C.

The invention is in the form of a generally rectangular cabinet with a tub 2 formed in the top thereof. A butcher block or suitable food preparation block 1 is inserted into tub 2 and has overall dimensions for a loose but relatively snug fit within tub 2.

Figure 3:
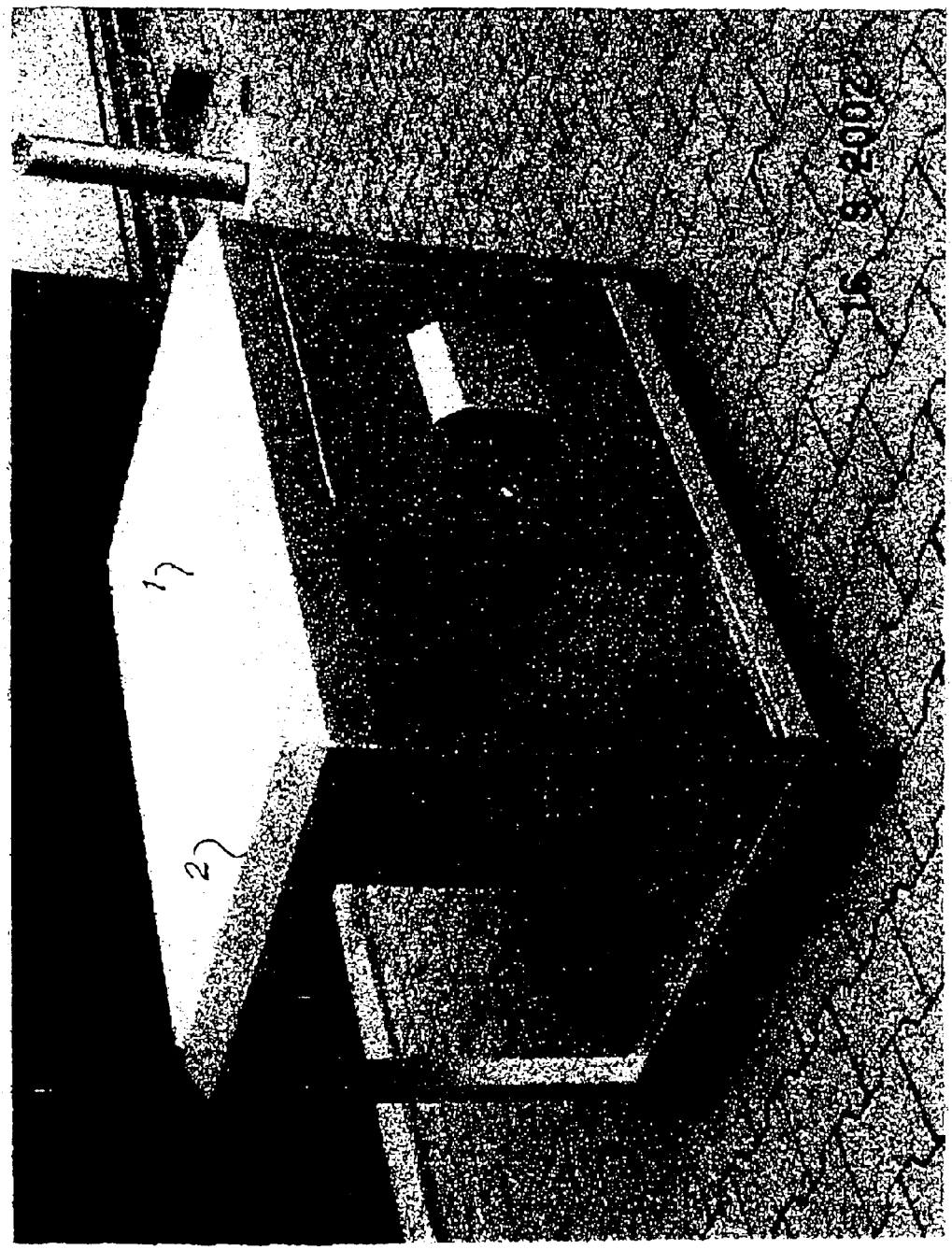
FIG. 3 is a perspective view of a second embodiment of the invention.

The invention may include an auxiliary work support surface 4 adjacent the tub 2, or the entire upper surface may include the tub 2 with block insert 1, as is the case with the second embodiment of the invention shown in FIG. 3.

In any event, the material chosen for block 1 should be one suitable for food preparation, such as a hard plastic, food grade stainless steel, hard wood, ceramic, etc.. Also, since the block 2 will be encased in water forming ice, it is desirable that the specific gravity of the block 1 material be greater than 1.00.

The tub 2 is filled with water hardened into ice 3, the water supplied from pipes 15, 16. If desired or required, the water may be sterile, and charged or bubbled with ozone or other suitable pathogen resistant gas. Channels 17 are provided as part of the tub 2 to allow new water to come in and be frozen as the layers 13 built up to form a work surface above the block upper layer 14. Alternatively, channels 17 may be employed for the introduction of ozone into the water.

Figure 1:
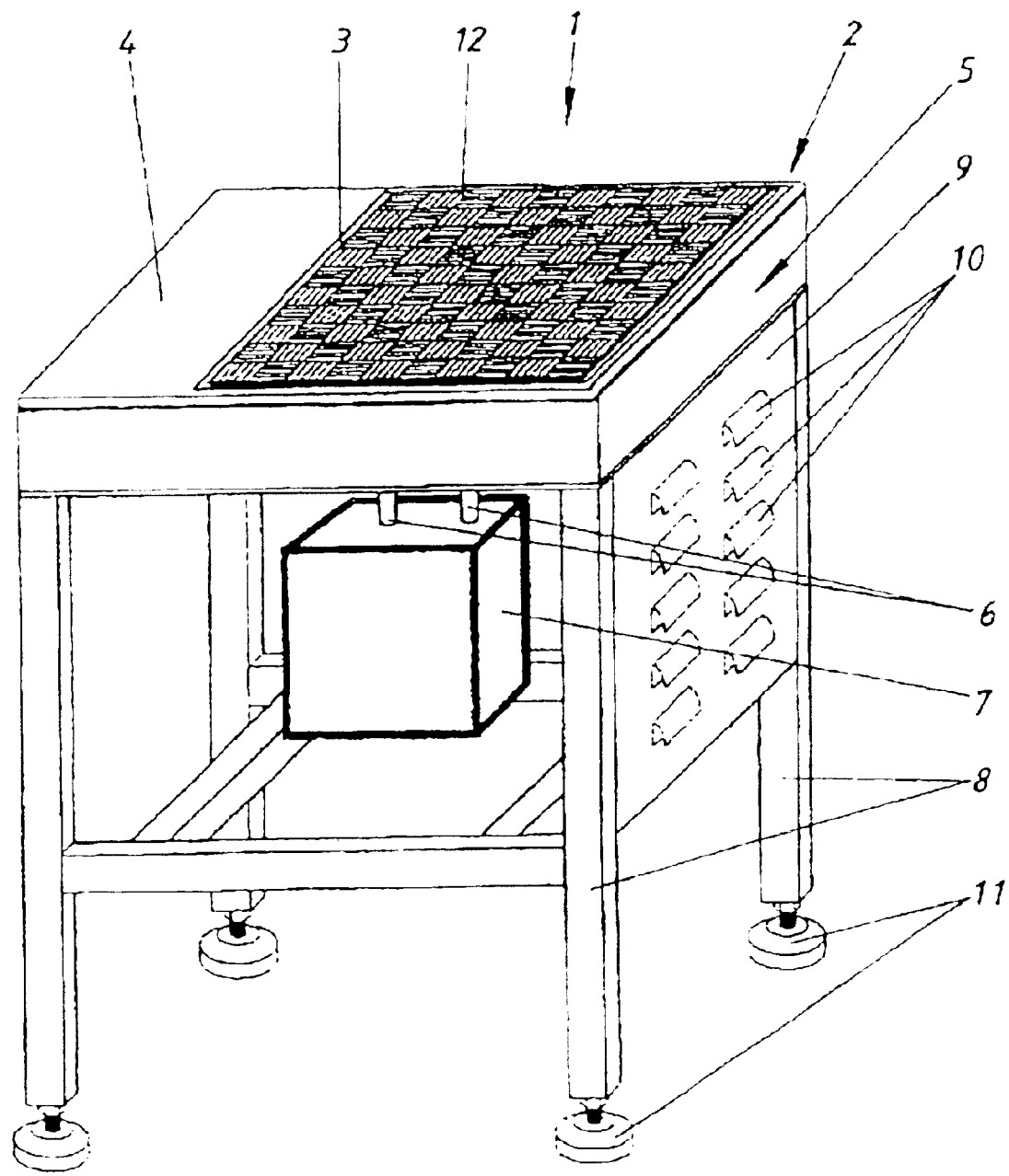
FIG. 1 is a perspective view of a bacteria resistant butcher table according to the present invention.
Figure 2:
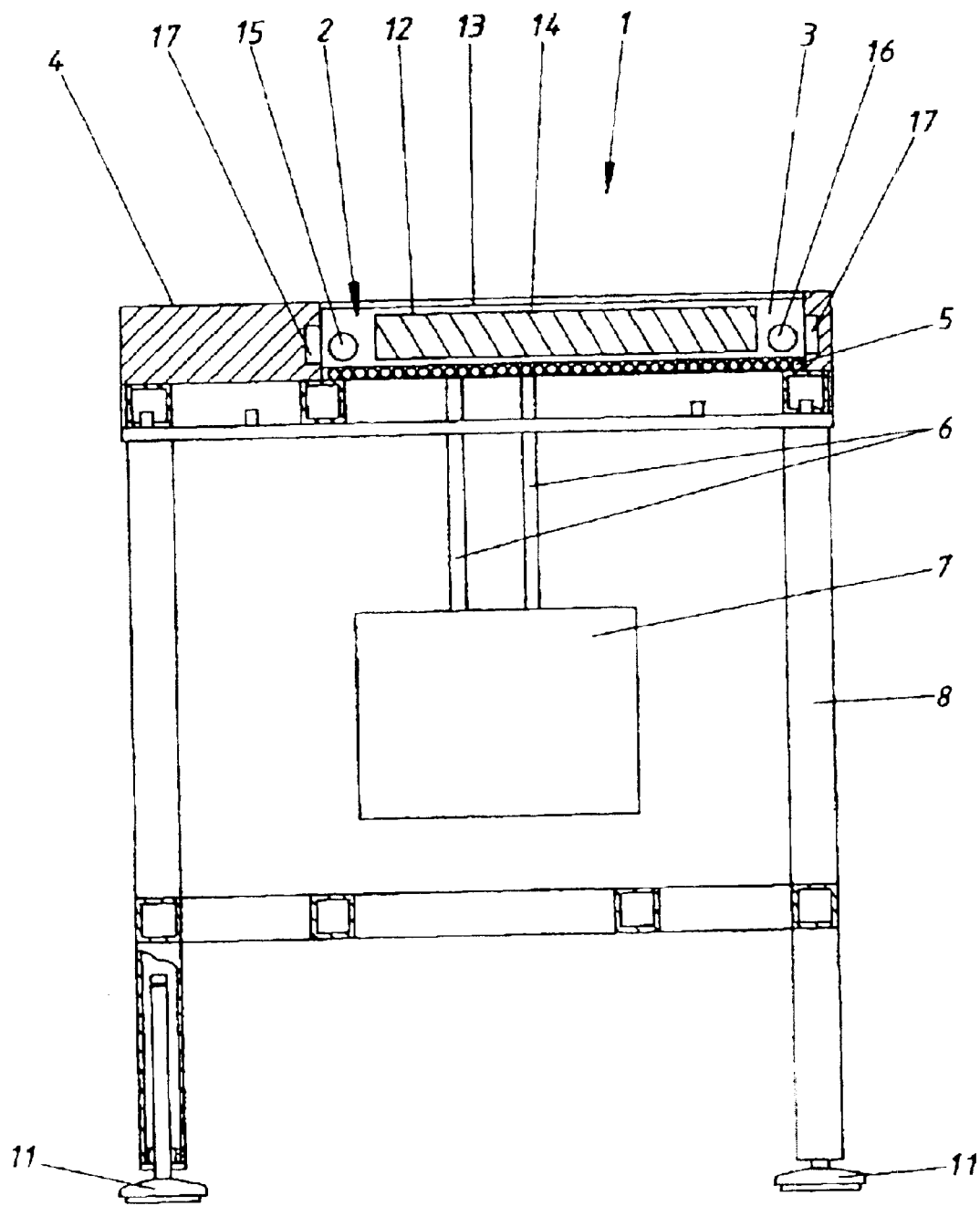
FIG. 2 is an elevational cross-sectional view of the table as shown in FIG. 1.

A refrigeration system is provided beneath the upper surface as shown in FIGS. 1 and 2. The system is within the central cabinet shown in the FIG. 3 embodiment. The refrigeration system includes refrigerant in a closed loop system, introduced to cooling coils 5 via a pipe 6, and returned via another pipe 6 to unit 7 which houses the required compressor and condenser components (not shown). The refrigerant system employed is well known to those skilled in the refrigeration art, and need not be further explained here. Heat exhausted from unit 7 may be ventilated through vents 10 in panel 9. A completed unit will include a four-walled cabinet as shown in the embodiment illustrated in FIG. 3.

The rest of the invention includes four support legs 8 at the four corners of the table. Each leg 8 has a vertically adjustable support pad or foot 11 which is used to assure that the top surface is perfectly level.

The operation of the invention is relatively uncomplicated. Water is introduced at near freezing temperature and frozen. As the ice layer or layers forming an upper work surface at 13 are ablated by work, the system is programmed to replace and reform bottom layers from beneath the top layers every 20 or 30 minutes or so. Thus, a constantly renewed surface of ice material which retards microorganisms and bacteria is provided.

Appropriate warning devices and alarms may be provided to control the temperature of the system at close to 0 degrees C., and to warn for the need of cleaning or other treatment if the presence of certain microorganisms or bacteria is detected. Also, several surfaces may be provided in serial and/or parallel fashion with individual cooling and temperature control so that a series and or number of work function may be performed.

As used in the claims hereinbelow, the term "bacteria resistant" is meant to include microorganism resistant and any other pathogen resistant property.

Thus it is seen that a food preparation table suitable for general food preparation and in particular butchering is provided that is extremely hygienic in structure and performance, easy to clean, and economical in operation, especially since time is not lost because of any need for constant cleaning of the food preparation surface.

It is to be understood that the present invention is not limited to the embodiments described above, but encompasses any and all embodiments within the scope of the following claims.

I claim:

1. A bacteria resistant food preparation table, comprising:

a stable, relatively level table top;

a shallow tub formed within said top;

a work surface supporting block within said tub; and ice, which is formed within said tub and encases said block, the ice formed on top of said block being an ablative work surface for the preparation of food thereon.

2. The bacteria resistant table according to claim 1, further comprising a refrigeration system for forming said ice.

3. The bacteria resistant table according to claim 1, wherein said block is made of plastic, stainless steel, hard wood, ceramic or combinations thereof.

4. The bacteria resistant table according to claim 3, wherein the specific gravity of the block is greater than 1.

5. The bacteria resistant table according to claim 1, wherein the specific gravity of the block is greater than 1.

6. The bacteria resistant table according to claim 1, further comprising a cabinet beneath said tub, there further being leveling support legs for disposing the tub in a level attitude.

7. The bacteria resistant table according to claim 1, there further being leveling support legs for disposing the tub in a level attitude.

8. The bacteria resistant table according to claim 1, further comprising water inlets within said tub for constant replenishing of water therein.

9. The bacteria resistant table according to claim 1, further comprising ozone introduction ports into said tub.

10. The bacteria resistant table according to claim 1, further comprising a secondary, flat work surface adjacent said tub.

* * * * *